UNITED STATES PATENT OFFICE.

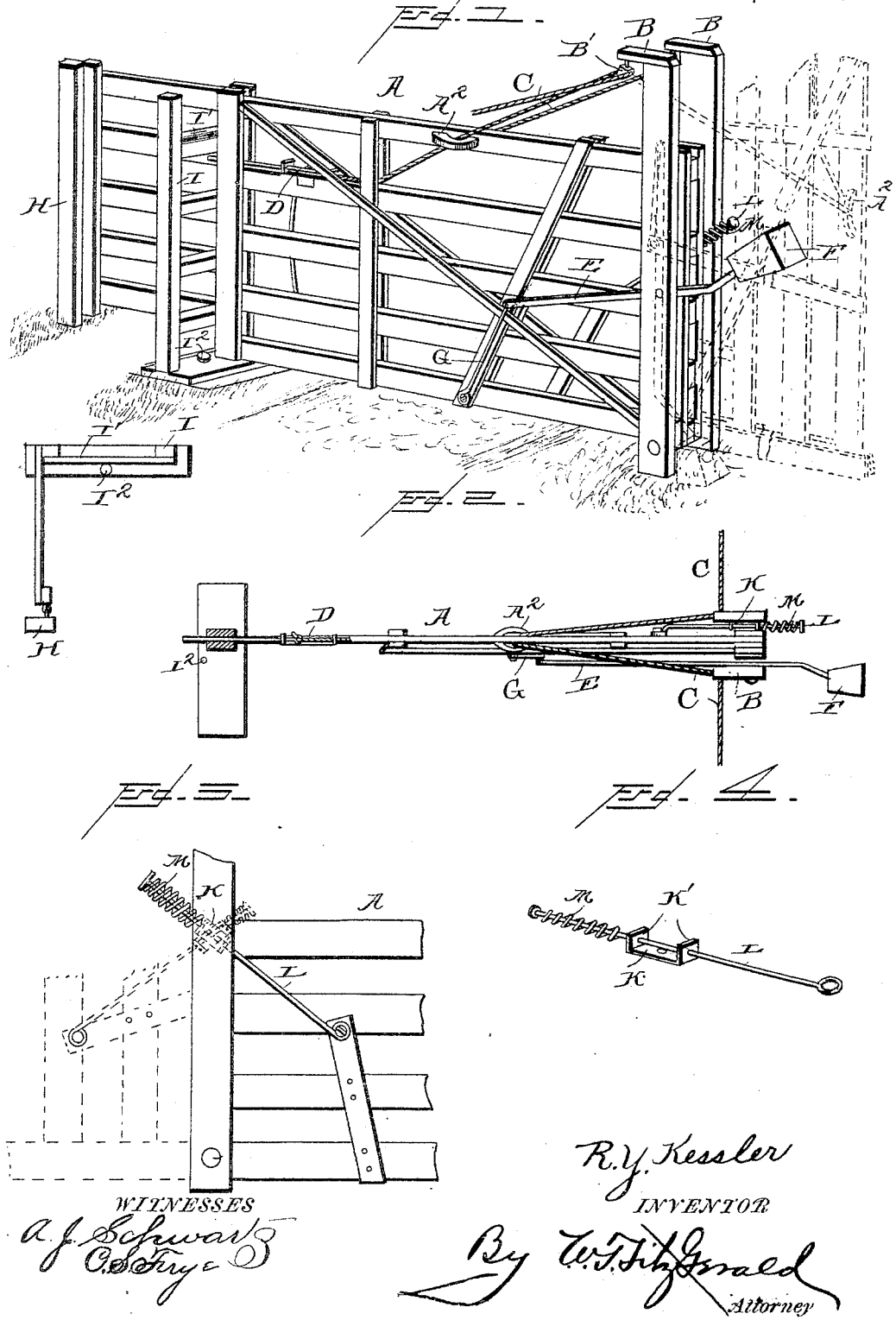

RICHARD YATES KESSLER, OF EDINBURG, ILLINOIS.

TILTING GATE.

SPECIFICATION forming part of Letters Patent No. 437,861, dated October 7, 1890.

Application filed July 15, 1890. Serial No. 358,791. (No model.)

*To all whom it may concern:*

Be it known that I, RICHARD YATES KESSLER, a citizen of the United States, residing at Edinburg, in the county of Christian and State of Illinois, have invented certain new and useful Improvements in Tilting Gates; and I do hereby declare the following to be a full, clear, and exact description of the invention, such as will enable others skilled in the art to which it appertains to make and use the same.

My invention consists in certain new and useful improvements in a tilting gate, which can be opened by a person on horseback or in a vehicle as readily as by a foot-passenger; and my invention will be hereinafter fully described and claimed.

Referring to the accompanying drawings, Figure 1 is a perspective side view showing the main gate closed and in dotted lines showing the gate opened. Fig. 2 is a top plan view showing a small end gate swung open and the main gate closed, the upper corner of the main gate being broken away to show the spring-latch. Fig. 3 is a side view of as much of the hinged end of the gate as will illustrate the operation of the reversible spring-rod; and Fig. 4 is a detail view of this rod with the swiveled bearing-plate and spring.

The same letters of reference indicate corresponding parts in all the figures.

Referring to the several parts of my invention by letter, A indicates the main gate, which is pivoted at its lower rear corner between the gate-posts B B. At the upper ends of these posts are swiveled small grooved rollers B'. The operating-cords C are connected to the rear end of a spring-actuated latch D and then pass upward through apertured lugs $A^2$ on the upper bar of the gate and through said grooved pulleys. The outer ends of the cords extend out on each side of the gate, so that it can be readily opened from either side. The gate is balanced by a weight F, secured on the rear end of the centrally-pivoted bar E, the inner end of this bar being pivotally connected by a rod G to the lower part of the gate, as shown. When the gate is closed, the end of its spring-catch engages on a bar I', forming part of the end gate. This end gate is hinged to the post H, and at its free end is formed with the section I, extending at right angles to the body of the gate. This gate is usually held closed by a stop $I^2$, running down through an opening in the lower gate-bar into the sill, and can be opened at any time for the convenience of a foot-passenger without disturbing the large main gate by raising the stop and swinging the gate open. When this gate is closed, its upper cross-bar I', extending at right angles across the free end of the large tilting gate, engages the spring-catch of the latter, the bar I' being preferably sheathed in metal to prevent wear. It will be seen that a pull on either of the cords C will draw back the spring-latch, and as the pull is continued will swing the tilting gate up and back into the opened position shown in dotted lines in Fig. 1, when a second pull on the cords will swing the gate down in its closed position. Apertured lugs $A^2$ hold the cords to the upper bar of the gate, so that when the gate is open and the cord is pulled the pull comes from the extreme upper bar of the gate, thus giving a much greater leverage in swinging the gate down into its closed position, so that a very slight pull on the cord will close the gate.

To the inner side of the right-hand post B is centrally swiveled or pivoted a bearing-plate K, having the parallel apertured ends K' K'. Through these ends runs a rod L, having a head $l$ formed at one end and pivoted at the other end to the rear part of the gate, as shown. A spiral spring M is coiled around the upper part of the rod between its end head and the upper end of the swiveled bearing-plate. It will now be seen that as the gate is swung down and closed the rod will slide through the ends of the bearing-plate and the spiral spring will be compressed between the headed end of the rod and the adjacent end of the bearing-plate, thus serving as a spring-buffer to prevent any shock or jar as the gate closes. When the gate is swung open, the swiveled bearing-plate turns with the rod as the gate moves backward and the spiral spring acts in a similar manner to prevent all strain and jar as the gate falls back into its open position. By the peculiar construction of this swiveled bearing-plate with the rod and coiled spring I provide an automatic spring-buffer, which will turn and adjust itself to all movements of the gate and effectually prevent any of the jars or shocks which injure and wear out this class of tilting gates when in constant use.

Having thus described my invention, what I claim, and desire to secure by Letters Patent, is—

1. The combination, with a tilting gate, of the swiveled bearing-plate K, having the apertured ends $K^2$, the rod L, passing through the said ends and pivoted at its lower end to the gate, and the spiral spring arranged on the upper end of the rod, substantially as set forth.

2. The combination, with a tilting gate having the spring-actuated latch, of the auxiliary gate having the section I, extending at right angles to the tilting gate, and the locking-bar I' at its upper end, substantially as set forth.

3. The combination, with a tilting gate having the spring-actuated latch, of the auxiliary gate hinged at the free end of the tilting gate, having the section I, extending at right angles across the end of the tilting gate and formed with the upper locking-bar I' and the lower bar having the bolt-aperture, and the locking-bolt $I^2$, substantially as set forth.

In testimony whereof I affix my signature in presence of two witnesses.

RICHARD YATES KESSLER.

Witnesses:
  JACOB BALLET,
  C. M. DE CAMP.